US012810079B2

(12) United States Patent
Haffari et al.

(10) Patent No.: US 12,810,079 B2
(45) Date of Patent: Nov. 24, 2026

(54) SYSTEM AND METHOD FOR SCALABLE GENERATION OF SYNTHETIC DATA FOR SEMANTIC PARSERS

(71) Applicant: Openstream Inc., Bridgewater, NJ (US)

(72) Inventors: Ghlolamreza Haffari, Wheelers Hill (AU); Rajasekhar Tumuluri, Bridgewater, NJ (US)

(73) Assignee: Openstream Inc., Bridgewater, NJ (US)

( * ) Notice: Subject to any disclaimer, the term of this patent is extended or adjusted under 35 U.S.C. 154(b) by 146 days.

(21) Appl. No.: 19/055,906

(22) Filed: Feb. 18, 2025

(65) Prior Publication Data

US 2025/0272498 A1 Aug. 28, 2025

Related U.S. Application Data

(60) Provisional application No. 63/558,711, filed on Feb. 28, 2024.

(51) Int. Cl.
*G06F 40/30* (2020.01)
*G06F 16/3329* (2025.01)
*G06F 16/36* (2019.01)

(52) U.S. Cl.
CPC .......... *G06F 40/30* (2020.01); *G06F 16/3329* (2019.01); *G06F 16/367* (2019.01)

(58) Field of Classification Search
CPC .... G06F 40/30; G06F 16/3329; G06F 16/367; G06F 40/205; G06F 40/211; G06F 40/295; G06F 16/36
See application file for complete search history.

(56) References Cited

U.S. PATENT DOCUMENTS

| | | | | |
|---|---|---|---|---|
| 2018/0349401 | A1* | 12/2018 | Ikawa | G06F 16/438 |
| 2019/0303498 | A1* | 10/2019 | Saha | G06F 16/3344 |
| 2022/0414342 | A1* | 12/2022 | Galitsky | G06F 40/56 |
| 2025/0053736 | A1* | 2/2025 | Zhao | G06F 16/367 |

* cited by examiner

*Primary Examiner* — Linda Wong
(74) *Attorney, Agent, or Firm* — Young Basile Hanlon & MacFarlane, P.C.

(57) ABSTRACT

A system and method for scalable generations of synthetic <logical form, utterance> pairs for training a semantic parser is disclosed. A semantic parser is trained on pairs of <logical form, utterance>. An ontology graph is constructed and derived from a plurality of enterprise documents and provides relationships among the concepts or classes of an organization. One or more paths are traversed among a plurality of source and destination node pairs, facilitating comprehensive semantic representation. Attributed query subgraphs are generated of source nodes, destination nodes, and hidden nodes. Each path is recognized among a variety of possible paths between source and destination nodes. Each path in the ontology query subgraph is validated by considering a plurality of predicates and a knowledge graph generates a natural language utterance. The utterances are refined and rephrased using a large language model, enhancing their coherence and linguistic quality.

20 Claims, 10 Drawing Sheets

Algorithm 1 Exhaustive enumeration over attributed query subgraphs for data generation

```
Require: G = (V, E): Ontology Graph
  D ← ∅
  for V_q^s ∈ 2^V do
    for V_q^t ∈ V do
      G_q, valid = create_query_subgraph(G, G_q^s, G_t^q)
      if valid then
        for A_1 × A_2 × .. × A_|V_q^s| ∈ 2^{V_q^s[1].A} × 2^{V_q^s[2].A} × .. × 2^{V_q^s[|V_q^s|].A} do
          for a ∈ V_q^t.A do
            if valid_attributed_qgraph(G_q, A_1, ..., A_|V_q^s|, a) then
              ℓ ← render_logical_form(G_q, A_1, ..., A_|V_q^s|, a)
              u ← render_utterance(G_q, A_1, ..., A_|V_q^s|, a)
              D ← D ∪ {(ℓ, u)}
            end if
          end for
        end for
      end if
    end for
  end for
  return D
```

FIG. 5

SYSTEM AND METHOD FOR SCALABLE GENERATION OF SYNTHETIC DATA FOR SEMANTIC PARSERS

CROSS-REFERENCE TO RELATED APPLICATIONS

The present application claims priority to and the benefit of U.S. Provisional Patent Application Ser. No. 63/558,711, filed Feb. 28, 2024, the contents of which are herein incorporated by reference as if set forth herein in its entirety.

BACKGROUND

Semantic parsing is an important task for several natural language processing (NLP) applications such as, for example, voice assistants. It aims to bridge the gap between human language and machine understanding by mapping natural language utterances ("utterances") to their corresponding logical forms. These logical forms represent the underlying meaning or intent conveyed by the utterances, enabling machines to perform various tasks such as question-answering, information retrieval, and dialogue management.

Advanced semantic parsers are seq2seq architectures based on large language models that have been pre-trained on vast amounts of text. Training accurate semantic parsers requires large amounts of annotated data, consisting of pairs of natural language utterances and their corresponding logical forms. Capturing such annotated data is often scarce and expensive to obtain, particularly in specialized domains or languages. This scarcity poses a significant bottleneck in the development and deployment of robust NLP applications, limiting their scalability and performance. For this purpose, there are various approaches, including data augmentation, transfer learning, and semi-supervised learning.

Existing methods for synthetic data generation often rely on simplistic templates or rules, resulting in synthetic data that lacks diversity and fails to capture the complexity of real-world language usage for the domain under consideration. Moreover, these methods may overlook the semantic relationships and context-dependent nuances present in natural language, leading to suboptimal performance when applied to semantic parsing tasks.

SUMMARY

Described herein are systems and methods for scalable generation of synthetic data for semantic parsers. A semantic parser is trained on pairs of <logical form, utterance>. An ontology graph is constructed and derived from a plurality of enterprise documents and provides relationships among the concepts or classes of an organization. One or more paths are traversed among a plurality of source and destination node pairs, facilitating comprehensive semantic representation. Attributed query subgraphs are generated of source nodes, destination nodes, and hidden nodes. Each path is recognized among a variety of possible paths between source and destination nodes. Each path in the ontology query subgraph is validated by considering a plurality of predicates and a knowledge graph generates a natural language utterance. The utterances are refined and rephrased using a large language model, enhancing their coherence and linguistic quality.

BRIEF DESCRIPTION OF DRAWINGS

The various embodiments of the disclosure will hereinafter be described in conjunction with the appended drawings, provided to illustrate, and not to limit, the disclosure, wherein like designations denote like elements, and in which:

FIG. 5 is an example algorithm for exhaustive enumeration over attributed query subgraphs for data generation in accordance with embodiments of this disclosure.

DETAILED DESCRIPTION

Figure 1:
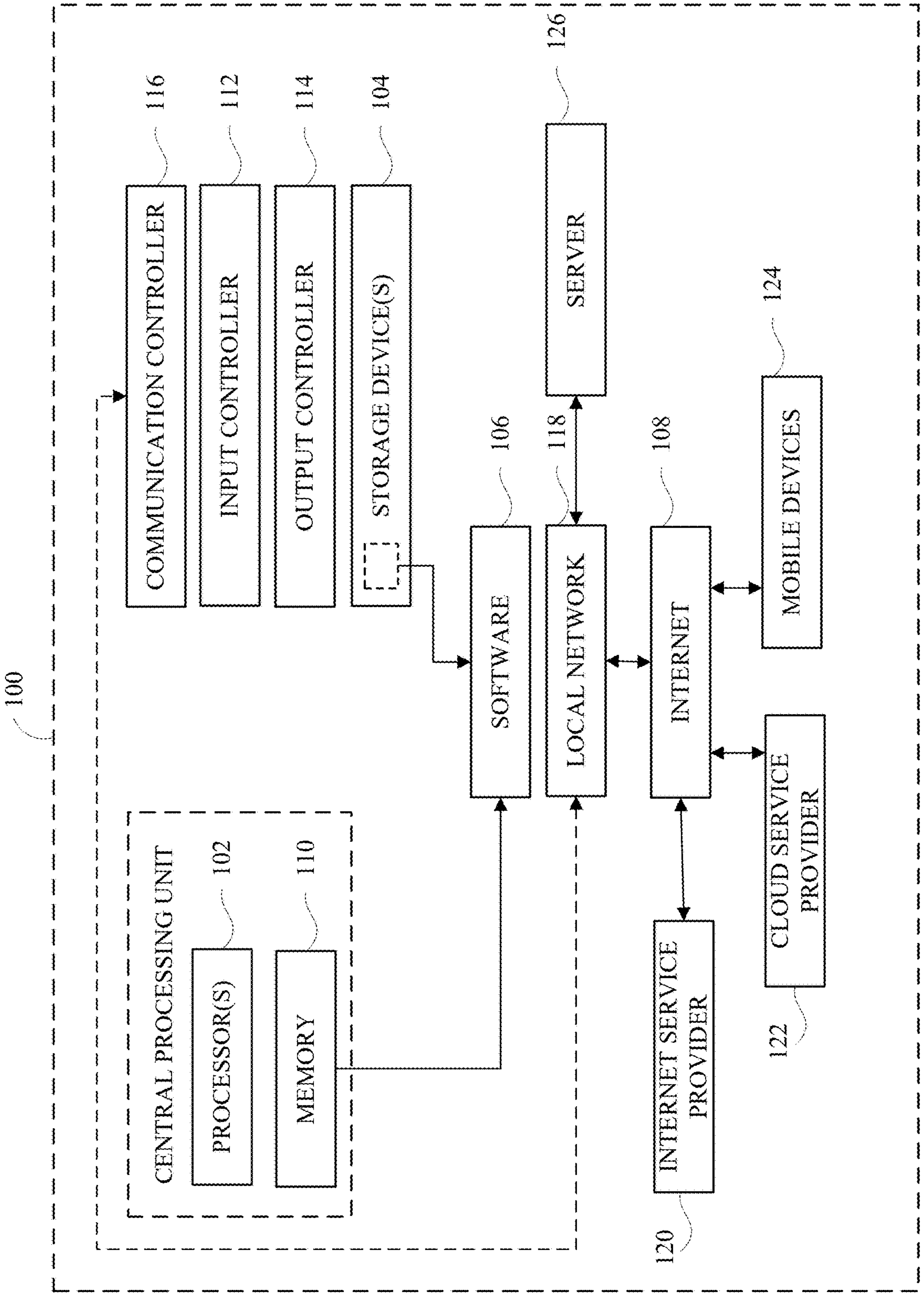
FIG. 1 is a block diagram of an example of a computing device and/or computer system in accordance with the embodiments of this disclosure.

Reference will now be made in greater detail to embodiments, examples of which are illustrated in the accompanying drawings. Wherever possible, the same reference numerals will be used throughout the drawings and the description to refer to the same or like parts.

As used herein, the terminology "server", "computer", "computing device or platform", or "cloud computing system" includes any unit, or combination of units, capable of performing any method, or any portion or portions thereof, disclosed herein. For example, the "server", "computer", "computing device or platform", or "cloud computing system" may include at least one or more processor(s).

As used herein, the terminology "processor" or "processing circuitry" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the term "engine" may include software, hardware, or a combination of software and hardware. An engine may be implemented using software stored in the memory subsystem. Alternatively, an engine may be hard-wired into processing circuitry. In some cases, an engine includes a combination of software stored in the memory and hardware that is hard-wired into the processing circuitry.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the term "memory" includes one or more memories, where each memory may be a computer-readable medium. A memory may encompass memory hardware units (e.g., a hard drive or a disk) that store data or instructions in software form. Alternatively or in addition, the memory may include data or instructions that are hard-wired into processing circuitry. The memory may include a single memory unit or multiple joint or disjoint memory units, which each of the multiple joint or disjoint memory units storing all or a portion of the data described as being stored in the memory.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. For example, the memory can be non-transitory. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks, or activities. For example, applications may perform one or more functions including, but not limited to, telephony, web browsers, e-commerce transactions, media players, scheduling, management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

As used herein, unless explicitly stated otherwise, any term specified in the singular may include its plural version. For example, "a computer that stores data and runs software," may include a single computer that stores data and runs software or two computers—a first computer that stores data and a second computer that runs software. Also "a computer that stores data and runs software," may include multiple computers that together stored data and run software. At least one of the multiple computers stores data, and at least one of the multiple computers runs software.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure and claims. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, and/or manufactures, while eliminating for the purpose of clarity other aspects that may be found in typical similar devices, systems, and methods. Those of ordinary skill may thus recognize that other elements and/or steps may be desirable or necessary to implement the devices, systems, and methods described herein. However, because such elements and steps do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Semantic parsing is a crucial task in natural language processing (NLP), enabling machines to understand and interpret human language. However, the scarcity of labeled data poses a significant challenge in training accurate semantic parsers, hindering their scalability and performance. The system and method described herein generates synthetic data to train and evaluate semantic parsers.

The system addresses this challenge by introducing a scalable approach to generate synthetic data for semantic parser training. The system uses generative modeling and natural language generation to autonomously create diverse and realistic datasets mimicking real-world language patterns and semantic structures in the form of <logical form, utterance> pairs. The synthetic data generated encompasses a wide range of linguistic and predicate variations, ensuring the robustness and adaptability of the semantic parser.

The method incorporates mechanisms for the validation of logical forms to ensure the reliability and applicability of the generated datasets. By seamlessly integrating with a multimodal dialogue engine, the system provided facilitates efficient training of semantic parsers, reducing the reliance on scarce annotated data for conversational AI applications.

The system includes flexible data generation using an ontology and deriving attributed query subgraphs. Through iteratively navigating possible combinations of source and destination nodes, the system continuously generates the diversity of the synthetic data that enhances the performance of the semantic parser across various domains and languages.

An ontology represents knowledge within a domain as a set of concepts/classes and the relationships that hold between them. It can be defined from the domain knowledge and set of domain rules. A knowledge graph represents a snapshot of an enterprise application data pertaining to a domain. A knowledge graph and its associated database structure are populated using the ontology specified for that domain. Knowledge graphs are built using several techniques, such as Named Entity Recognition, Relation Extraction, and Entity Linking.

The semantics (or meaning) of a natural language expression or utterance can be represented as a logical form. Once an utterance undergoes complete parsing and resolves its syntactic ambiguities, its meaning is distinctly captured within a logical form. That is, a logical form might have several equivalent syntactic representations. Semantic parsing involves the process of translating an utterance into a formal representation of meaning such as logical forms or structured queries.

In implementations, natural language generation, ontology modeling, and knowledge graph reasoning are integrated to generate large synthetic data for expanding the training corpus and enhancing the generalization capabilities of semantic parsers.

In implementations, a system and method is provided for generating synthetic data for training a semantic parser in a multimodal virtual assistant environment or system. The system and method provide a scalable solution for addressing the data scarcity issue in semantic parser development. By synthetic data generation, the system provides robust and scalable semantic parsing models, advancing the capabilities of natural language understanding systems across diverse domains and applications.

In implementations, a system and method for scalable generations of synthetic <logical form, utterance> pairs for training a semantic parser is disclosed. A semantic parser is trained on pairs of <logical form, utterance>. The method involves the construction of an ontology graph derived from a plurality of enterprise documents and provides relationships among the concepts or classes of an organization. The method includes traversing one or more paths among the plurality of source and destination node pairs, facilitating comprehensive semantic representation. The method includes generating attributed query subgraphs comprised of source nodes, destination nodes, and hidden nodes. The method includes recognizing each path among a variety of possible paths between source and destination nodes. Each path in the ontology query subgraph is validated by considering a plurality of predicates and a knowledge graph generates a natural language utterance. The utterances are refined and rephrased using a large language model, enhancing their coherence and linguistic quality.

In implementations, a framework for constructing synthetic datasets that closely mimic real-world language patterns and semantic structures is described herein.

FIG. 1 is a block diagram of a system that comprises a computing device 100 to which the present disclosure may be applied according to an embodiment of the present disclosure. The system includes at least one processor 102, designed to process instructions, for example computer readable instructions (i.e., code) stored on a storage device 104. By processing instructions, processor 102 may perform the steps and functions disclosed herein. Storage device 104 may be any type of storage device, for example, but not limited to an optical storage device, a magnetic storage device, a solid-state storage device, or a non-transitory storage device. The storage device 104 may contain software 106 which may include a set of instructions (i.e., code). Alternatively, instructions may be stored in one or more remote storage devices, for example storage devices accessed over a network or the internet 108. The computing device 100 also includes an operating system and microinstruction code. The various processes and functions described herein may either be part of the microinstruction code, part of the program, or a combination thereof, which is executed via the operating system. Computing device 100 additionally may have memory 110, an input controller 112, and an output controller 114 and communication controller 116. A bus (not shown) may operatively couple components of computing device 100, including processor 102, memory 110, storage device 104, input controller 112, output controller 114, and any other devices (e.g., network controllers, sound controllers, etc.). Output controller 114 may be operatively coupled (e.g., via a wired or wireless connection) to a display device such that output controller 114 is configured to transform the display on display device (e.g., in response to modules executed). Examples of a display device include, and are not limited to a monitor, television, mobile device screen, or touch-display. Input controller 112 may be operatively coupled via a wired or wireless connection to an input device such as a mouse, keyboard, touch pad, scanner, scroll-ball, or touch-display, for example. An input device (not shown) is configured to receive input from a user and transmit the received input to the computing device 100 vial the input controller 112. The input may be provided by the user through a multi-modal interface-based computer-implemented tool. These inputs are, but not limited to, images, speech, audio, text, facial expressions, body language, touch, scanned object, and video. The communication controller 116 is coupled to a bus (not shown) and provides a two-way coupling through a network link to the internet 108 that is connected to a local network 118 and operated by an internet service provider (ISP) 120 which provides data communication services to the internet 108. A network link may provide data communication through one or more networks to other data devices. For example, a network link may provide a connection through local network 118 to a host computer, to data equipment operated by the ISP 120. A cloud service provider 122 and mobile devices 124 provides data store and transfer services to other devices through internet 108. A server 126 may transmit a requested code for an application through internet 108, ISP 120, local network 118 and communication controller 116. FIG. 1 illustrates computing device 100 with all components as separate devices for ease of identification only. Each of the components shown in FIG. 1 may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing device 100 may be implemented as one or more servers, for example a farm of networked servers, a clustered server environment, or a cloud network of computing devices.

Figure 2:
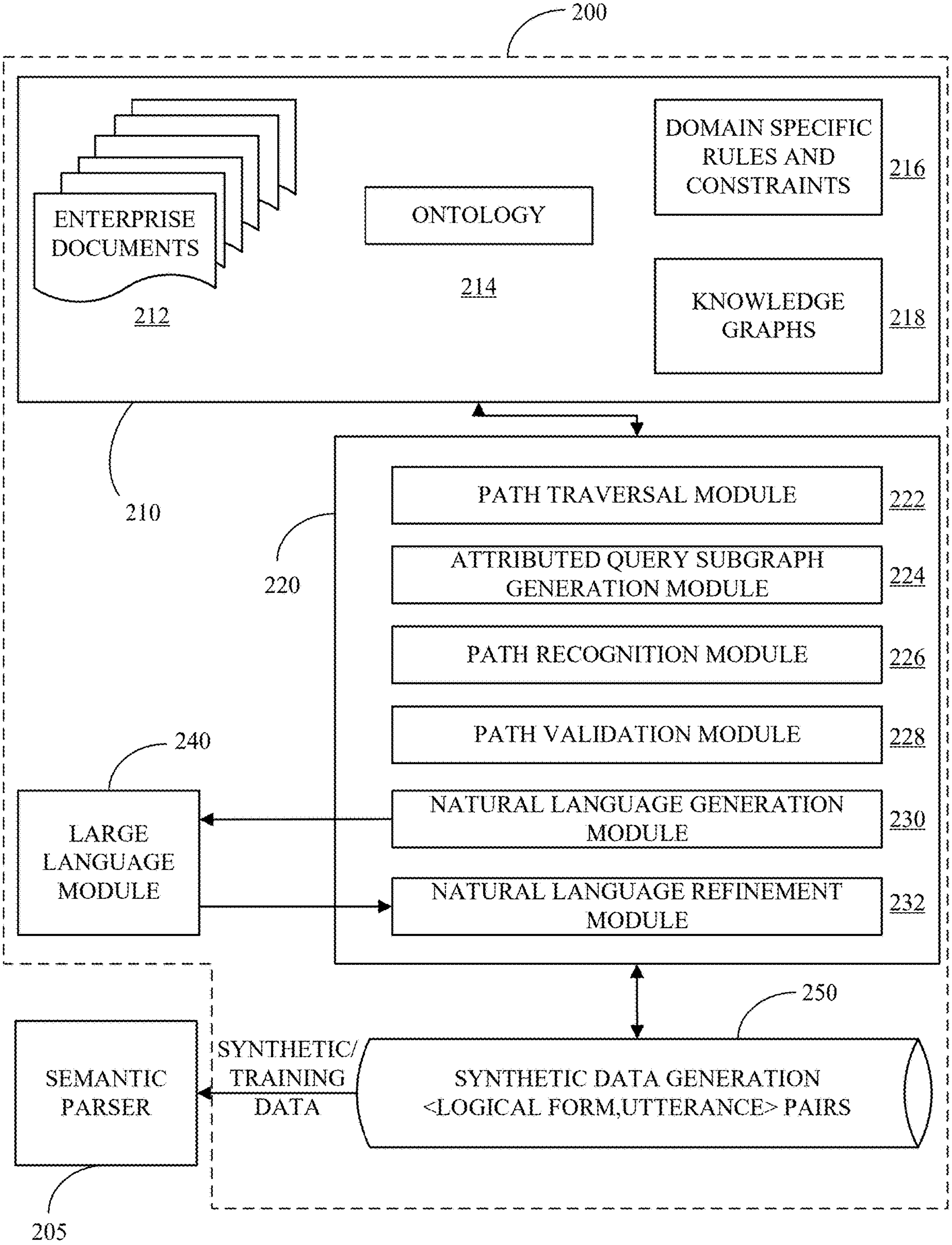
FIG. 2 is a block diagram of a system and/or framework for constructing synthetic data for a semantic parser in accordance with embodiments of this disclosure.

FIG. 2 is a block diagram of a system and/or framework 200 for constructing synthetic data for a semantic parser 205 in accordance with embodiments of this disclosure. The system 200 includes engines, components, and processes involved in the system for scalable generation of synthetic data for training the semantic parser 205. The components can include, but are not limited to, an ontology component 210, utterance generation component 220, a large language model 240, and a synthetic data generation component 250. The ontology component 210 can include, but is not limited to, enterprise documents 212, an ontology or ontology graph 214, domain-specific rules and constraints 216, and knowledge graphs 218. The utterance generation component 220 can include, but is not limited to, a path traversal component 222, an attributed query subgraph generation module 224, a path recognition module 226, a natural language generation module 228, and a natural language refinement module 230.

Described herein is ontology graph construction using the ontology component 210. The ontology graph 214 can be constructed from a diverse set of enterprise documents, such as the enterprise documents 212. Various techniques such as natural language processing (NLP), entity extraction, and relationship extraction are employed to extract concepts or classes and their relationships from the enterprise documents 212. The ontology graph 214 G=(V, E) is a directed graph where a node v∈V represents a concept/class, and an edge e∈E represents a relation. The ontology graph 214 serves as a structured representation of the domain-specific knowledge, capturing semantic relationships among different entities.

Figure 3:
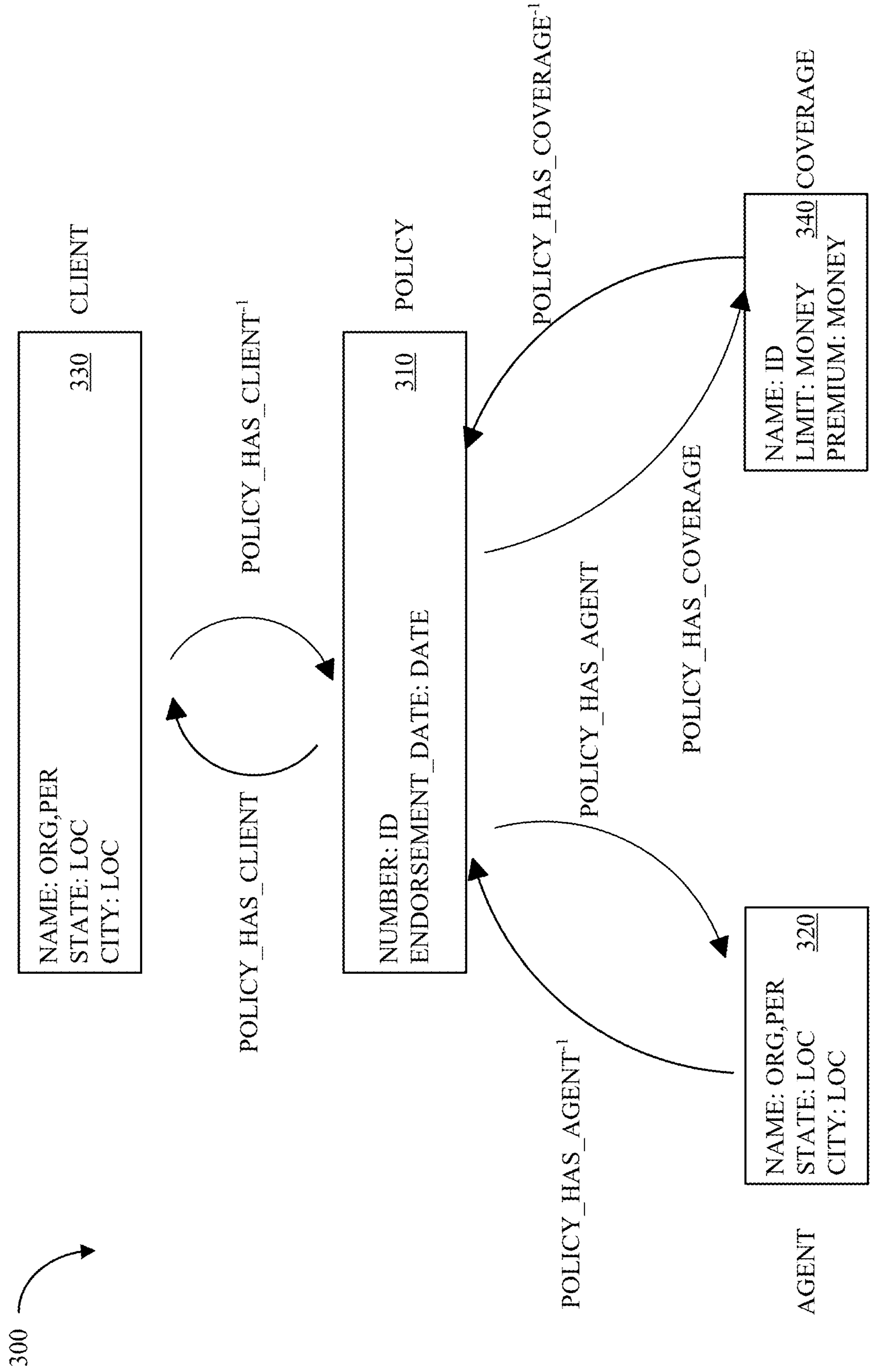
FIG. 3 is an illustration of an example ontology graph in accordance with embodiments of this disclosure.

FIG. 3 is an illustration of an example ontology graph 300 in accordance with embodiments of this disclosure. In the illustrative ontology graph, the domain is the insurance domain. The ontology graph 300 can include, but is not limited to, a number of nodes such as nodes 310, 320, 330, and 340. In the example ontology graph, nodes 310, 320, 330, and 340 represent the concepts of the domain and are labeled as Policy, Agent, Client, and Coverage, respectively. Each node v has a set of attributes v.A. Each attribute a∈v.A has a set of types v.a.type⊂T which determines the types of its domain of values. Each concept node, e.g., nodes 310, 320, 330, and 340, has a set of typed attributes. In an illustrative example, in node 320 (which is labeled as Agent) "name: ORG,PER" shows an attribute "name" can adopt entities from the types: ORG (organization) and PER (person).

The relations are edges between the concept nodes, and are labelled with the predicates representing them in the logical forms (LFs). Each edge e is labeled by the following information:

arity: The arity of the relation, which can be in {1:1, 1:n, n:1, n:n}.

In an example with respect to FIG. 3, a 1:n arity of the relation between Client and Policy indicates that "A Client may have multiple Policies but each policy still belongs to one Client.

verbal: The set of possible verbalizations of the relation, to be used for the clunky utterance generation.

Examples are shown with respect to FIG. 3. Presented are examples of possible verbalizations for the relationship "Client-has-Policy" with an arity of one-to-many (a client may have multiple policies, but each policy belongs to only one client) between the Client and Policy nodes:

"The client holds multiple policies."
"This client has several policies."
"A client is associated with multiple policies."
"The client owns more than one policy."
"Several policies belong to this client."
"A number of policies are held by the client."
"The client has a portfolio of policies."
"The client is linked to several policies."

These verbalizations highlight the one-to-many relationship where one client can have multiple policies, but each policy is tied to a single client.

pred: The predicate representation of the relation, to be used for the logical form (LF) meaning representation.

In an example with respect to FIG. 3, for the relation "policy_has_client", the predicate representation might be:

Predicate: policy_has_client(Policy, Client)

This represents the logical form where the predicate policy_has_client(Policy, Client) describes the relationship between the Policy (first argument) and the Client (second argument). In logical form, it is a formal representation of the meaning behind the natural language utterance, such as "The policy belongs to the client."

Fwd: It is a Boolean and shows whether the relation edge is traversed forward or backward. The backward direction represents the inverse relation of the forward relation when needed in the generation of the meaning LF.

Described herein is path traversal and query subgraph generation using the path traversal component 222 in the utterance generation component 220.

Once an ontology graph is constructed, the method involves traversing one or more paths among source and destination node pairs within the ontology graph. The path traversal component 222 may generate one query subgraph by traversal of the one or more paths among source and destination node pairs within the ontology graph. That is, the path traversal component 222 may consider the shortest path from each source node to the target/query node. The union of the nodes on these shortest paths then defines the query subgraph. As such, there is only one query subgraph. A (reverse) topological ordering of the nodes in a query subgraph leads to a logical form (i.e., a form of semantic representation) and the corresponding clunky form in natural language. It is noted that while semantic representation and logical form are closely related concepts, they are not exactly the same. A semantic representation refers to a broader concept of how the meaning of a natural language expression or utterance is captured. It can take many forms, including structured data, ontological graphs, or logical forms, and it aims to represent the meaning or intent behind the language. That is, it is a general term that refers to any systematic representation of meaning, not tied to a specific formalism. A logical form is a specific type of semantic representation that translates a natural language utterance into a formal, often structured, meaning representation. For example, a logical form can use a predicate logic structure. Thus, logical forms focus on a machine-readable, formal grammar that precisely defines the structure of meaning. In other words, all logical forms are semantic representations, but not all semantic representations are logical forms.

A query subgraph Gq=(Vq, Eq) is a subgraph of the ontology graph, i.e., Vq∈V and Eq∈E. A query subgraph is designated by a set of source nodes $$V_q^s$$

and a target node $$V_q^t.$$

To generate a query subgraph, any subset of the graph nodes is considered as source nodes, and any remaining node is considered as the target node (the method loops over all possible combinations). In implementations, the method takes the shortest path from each source node to the target node in the ontology graph. The edges of these paths are included in the query subgraph, and the intermediate nodes encountered on these paths are called hidden nodes $$V_q^h$$

and included in the subgraph nodes in addition to the source nodes and target node.

The nodes of the query subgraph consist of three distinct types of nodes including the source nodes, the target node, and the hidden nodes:

$$V = V_q^s U V_q^t U V_q^h.$$

Valid combinations of source and target nodes to form a query subgraph are defined as follows:

1) The target node must be reachable from all of the source nodes.
2) It follows that the query subgraph is a connected directed acyclic graph (DAG).

Each semantic representation is translated into an initial logical form by mapping each traversed path in the query subgraph to corresponding predicates in the initial logical form. That is, semantic representations are translated into logical forms based on the traversed paths in the query subgraph. This step involves creating logical forms based on path-specific information but may not yet have the complete context provided by the attributes or the validation of all predicates in the attributed query subgraphs as described herein.

Described herein are attributed query subgraphs generation using the attributed query subgraph generation module 224. In implementations, the selection of attributes subset for a query subgraph allows specializing it according to the domain knowledge in different domains/problems.

Attributed query subgraphs are generated based on the traversed paths, comprising source nodes, destination nodes, and hidden nodes. An attributed query subgraph is a query subgraph, where for each source node, a subset of its attribute set is selected. The attributes in these designated subsets will eventually impose constraints on the generated LF. Attributes associated with each node capture contextual information, enhancing the richness of semantic representation.

One or more logical forms are then generated from the initial logical forms based on each of the attributed query subgraphs. In this step, the logical forms generated are a refined version of the logical forms (i.e., the initial logical forms) generated previously. At this stage, these are final logical forms, refined and completed after the paths have been fully validated (i.e., after predicates are applied, paths are grounded, and other attributes are considered). This step reflects the logical form that includes the knowledge derived from the fully validated paths and any refinements made to the representation.

The first step creates (intermediate or initial set of) logical forms based on direct path traversal without full consideration of all possible relationships, attributes, or path validation. The second step refines or finalizes the logical forms by incorporating more contextual and detailed information after validation and grounding using the full set of attributes, predicates, and rules from the attributed query subgraph.

Figure 4A:
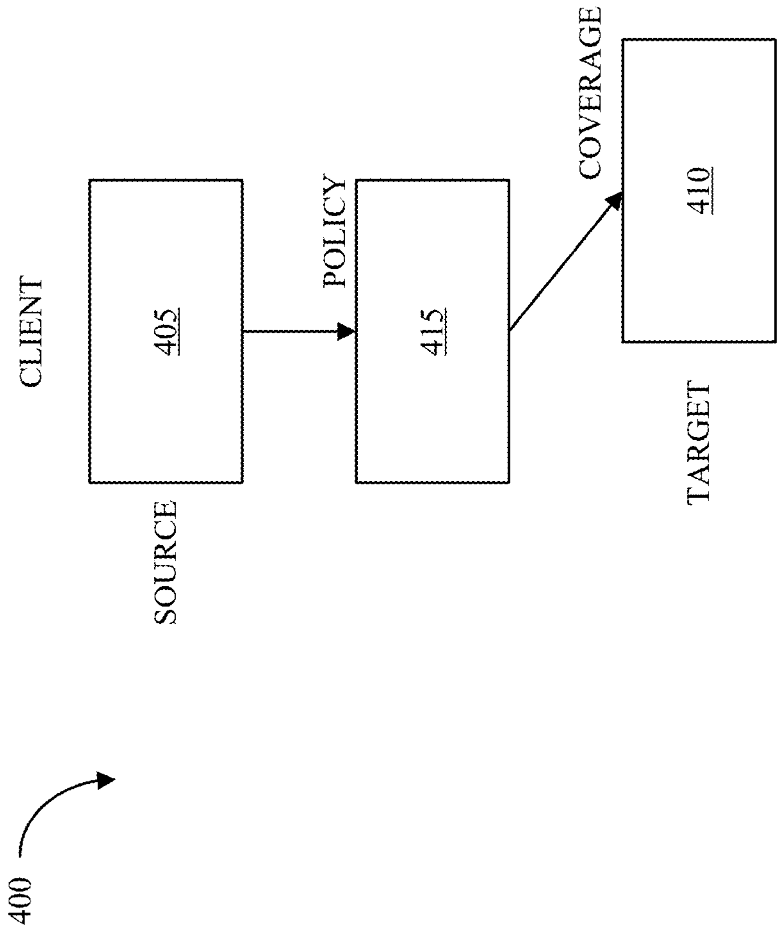
FIG. 4A-4C are illustrations of an example query subgraph and attributed query subgraph enumerated from an ontology graph in accordance with embodiments of this disclosure.
Figure 4B:
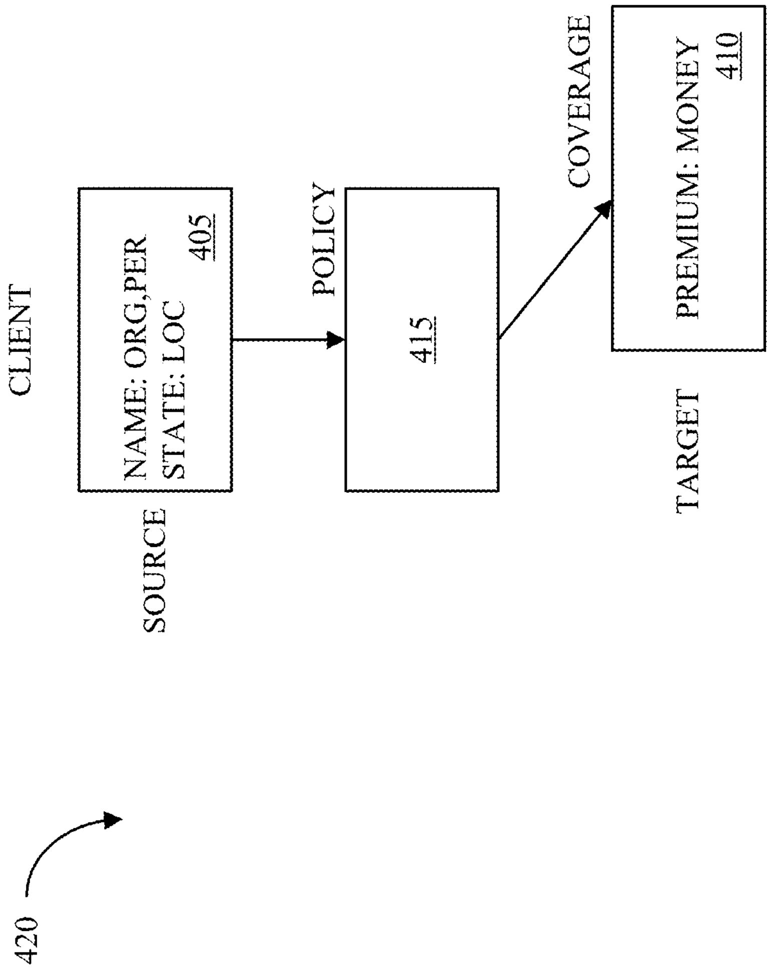
Figure 4C:
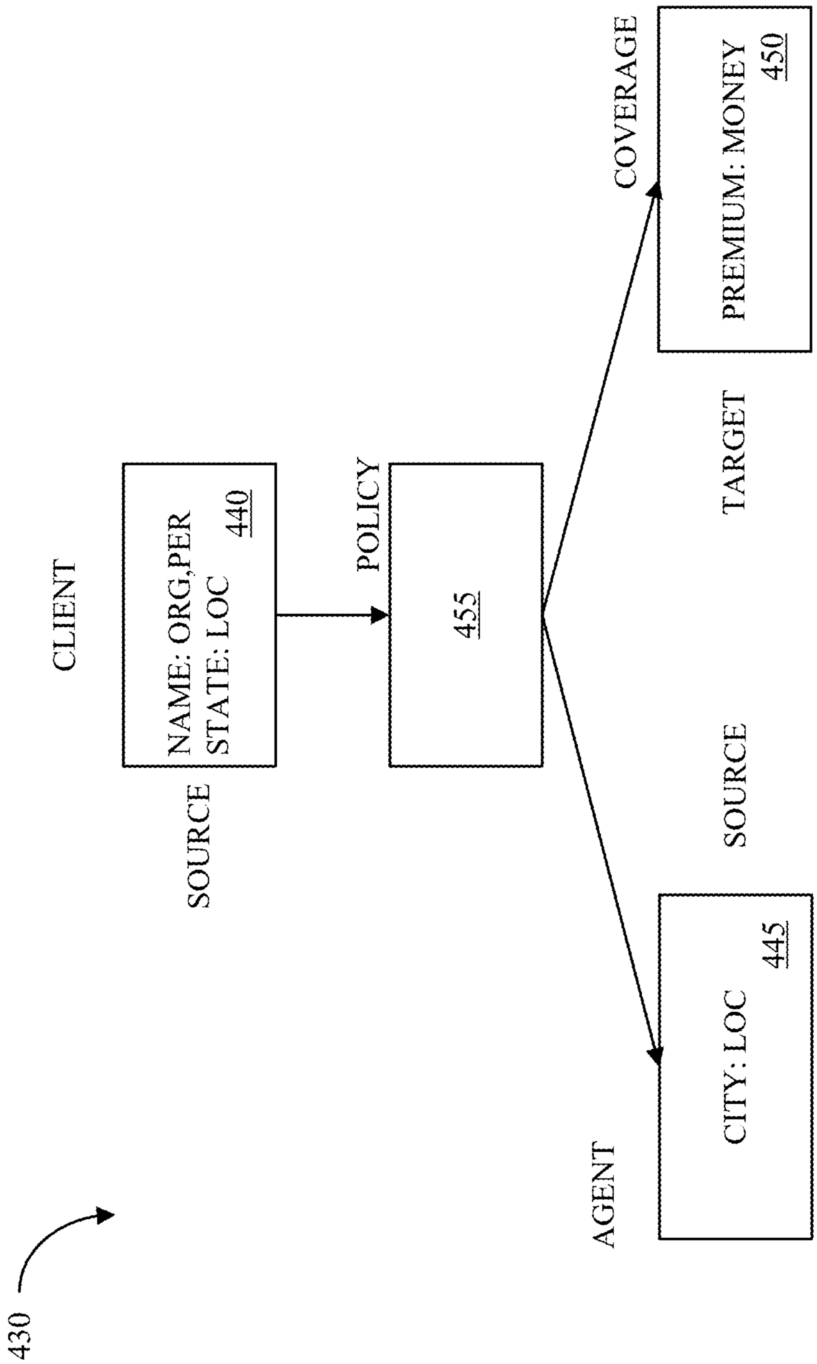

FIG. 4A-4C are illustrations of an example query subgraph and attributed query subgraph enumerated from an ontology graph in accordance with embodiments of this disclosure. FIG. 4A is a query subgraph 400 with a source 405, target 410, and hidden node 415. FIG. 4B is an attributed query subgraph 420, where the source node 405 and the target node 410 have been assigned attributes to appear in the LF. That is, FIG. 4B corresponds to the same query subgraph in FIG. 4A except where the source node 405 and the target node 410 are assigned attributes. FIG. 4C is an attributed query subgraph 430 with more than one source node. In an illustrative example, the attributed query subgraph 430 can include a source node 440, a source node 445, a target node 450, and a hidden node 455.

The path recognition module 226 recognizes each path among a variety of possible paths between source and target or destination nodes within the ontology graph using the knowledge of the attributed query subgraph(s). Recognition of a path refers to or means identification of a path among the variety of possible paths. Path recognition using the knowledge of the attributed query subgraph ensures the identified paths are contextually relevant and semantically meaningful within the domain represented by the ontology. This knowledge allows the path recognition module 226 to filter out irrelevant or nonsensical paths and focus only on those that are meaningful for the specific query. Without leveraging the attributed subgraph, the system might identify paths that are syntactically valid but semantically incorrect or irrelevant to the domain. Further, it accurately captures the specific relationships between nodes. For instance, in an enterprise ontology, a "policy-has-client" relationship may be constrained by certain attributes (e.g., client types, policy categories). Recognizing a path based on this specific knowledge ensures that the identified paths represent valid logical relationships rather than arbitrary or incorrect ones. The attributed query subgraph helps disambiguate multiple potential paths between nodes by incorporating information such as predicates, directionality, and constraints. For example, a source node might have multiple possible destination nodes, but only some of them may be valid depending on the relationship type. The knowledge of attributes ensures that the path recognition module selects paths that align with the intended meaning of the query. By narrowing down possible paths based on semantic attributes, the system can focus on traversing only the paths that are most likely to be meaningful, reducing the computational complexity of the task. The attributed query subgraph often encodes domain-specific rules or business logic. For example, certain types of relationships may be prohibited or required in certain contexts. The path recognition module 226, by using the knowledge of the attributed query subgraph, can ensure that the identified paths adhere to these rules, preventing incorrect or incomplete representations of the query's intent. Thus, performing path recognition with the knowledge of the attributed query subgraph ensures that the paths identified are not only syntactically correct but also semantically valid, domain-specific, and aligned with business or ontological rules. This leads to a more accurate and relevant generation of logical forms or natural language utterances.

The path validation module 228 can validate each path in the attributed query subgraph using and/or in consideration of the semantic constraints, syntactic patterns, domain-specific rules (all of which are shown as 216 in FIG. 2), and the predicates. This validation process ensures the relevance and accuracy of the generated semantic representations.

Natural language utterance generation is described herein. The natural language utterance generation is a multi-step process. For each attributed query subgraph, natural language utterances are generated for all possible combinations of source to destination paths in the attributed query subgraph. These initial natural language utterances are based on the structure of the ontology and the relationships captured by the attributed query subgraph. The natural language utterances reflect the semantic representation of the paths but are likely to be basic or preliminary. A knowledge graph is then applied to ground the natural language utterances for valid paths as described herein. That is, the natural language utterances generated through enumeration are refined and enriched using the knowledge subgraph grounding. This results in more precise and contextually grounded natural language utterances, reflecting the semantic richness of the knowledge graph.

Described herein is LF-utterance generation using the natural language generation module 230, the natural language refinement module 232, the large language model 240, and the synthetic data generation component 250. To scalably generate synthetic LF-utterance data, all possible attributed query subgraphs are exhaustively enumerated. For each query subgraph, an LF meaning representation and an utterance is generated as described herein. FIG. 5 is an example algorithm for exhaustive enumeration over attributed query subgraphs for data generation in accordance with embodiments of this disclosure. The illustrative algorithm can include each of the steps described herein including, but not limited to, generation of attributed query subgraph generation, path recognition, validation, utterance generation, LF generation, and synthetic data generation.

In typical NLP tasks, tautologies involve refining the logic generation process to eliminate unnecessary redundancy or incorporating additional constraints for more meaningful representations. All possible combinations of the source nodes subsets, target nodes, and their attribute subsets are looped over to generate the <logical form, utterance> pairs. If these different combinations are semantically different, then the generated <logical form, utterance> examples are semantically different. However, if there are some different combinations, that are semantically equivalent, then the corresponding <logical form, utterance> examples are considered semantically equivalent. The domain-specific rules and/or constraints are used to identify the subgraph nodes for generating semantically meaningful utterances.

In implementations, in addition to predicates on node attributed values, conditions (like AND graph, AND-OR graph, etc) on relationship types are considered to generate more synthetic samples.

For handling nested (co-referenced) sub-graphs, the method provided allows to have multiple nodes with the same type in the graph. Thus, two different nodes with the type 'policy' can exist, and when considering one of them to be the source and the other to be the target, it allows for generating the logical form corresponding to an utterance that is nested in nature.

Described herein is realization of the LF.

To render an attributed query subgraph to a logical form (LF), the vertices are topologically sorted, and then the edges are ordered, accordingly. Each edge (classh,classt) is visited in the sorted edges, and following steps are taken and/or applied:

- For each node v∈{h,t}, a typed variable declaration expression is added to the logical form if that node is visited for the first time: v.label($X_v$), where $X_v$ is a unique variable assigned to the node v. In case it is a source/target node, the quantifier for all is added, otherwise, if it is a hidden node, the quantifier 'there exists' is added.
- For each node v∈{h,t}, if it is a source node and is visited for the first time, an expression is added to LF to constrain those attributes of the node, designated in the attributed query subgraph, to unique constants.
- For the edge, an expression is added based on the predicate representation of the edge, and the variables assigned to the adjacent nodes. If the edge is traversed in the forward direction, e.pred(Xh, Xt) is added; otherwise, if it is traversed in the backward direction, e.pred(Xt, Xh) is added.

An expression is added to the beginning of the LF for querying about the target node $$V_q^t$$

and its attribute "a" in the attributed query subgraph, Query $$\left(X_q^t \cdot V_q^t \text{ label}.a\right).$$

For the example of the attributed query subgraph in FIG. 4B, the corresponding realized LF by the FIG. 5 algorithm is shown in Table 1.

TABLE 1

```
QUERY(X3.premium) such that,
for all X1 : Client(X1) , X1.name=C1 AND X1.state=C2,
there exists X2 : Policy(X2),
Policy has Client(X2,X1),
for all X3 : Coverage(X3) , X3.limit=C3,
    Policy has Coverage(X2,X3)
```

Described herein is realization of the utterance.

For rendering the utterance, the topologically sorted edges is traversed in reverse, i.e., from the last to the first edge in the list, as follows:

- For each edge e=(h,t), the verbalisation of the reversed edge $e^r$(t,h) from the ontology graph is added, i.e., $e^r$.verb.
- If the head node h is a source node, for each of its attributes a, designated in the attributed query subgraph, the following expression is added $X_h$.a' is $c_{h,a'}$ where $X_h$ is the unique variable assigned to the node (when the LF was generated), and $c_{h,a'}$ is the unique constant assigned to the source node h for its designated attribute a' (when the LF was generated).

A "wh" question is added to the beginning of the utterance based on the target node and its attribute, what are all $$V_q^t\text{.label } V_q^t\text{.label}.a$$

for which.

For the running example of the attributed query subgraph in FIG. 4B, the corresponding realized utterance by the algorithm of FIG. 5 is shown in Table 2.

TABLE 2

| |
|---|
| what are all coverage premium for which coverage belongs to policy, policy has client, client name is C1, client state is C2? |

By using the LLM 240, this clunky form of the question is re-written and improved with the prompt "Please fluently re-write the following sentence with broken English" and is shown in Table 3.

TABLE 3

| |
|---|
| QUERY(X3.premium) such that , for all X1 : Client(X1) , X1.name=C1 AND X1.state=C2 , there exists X2 : Policy(X2) , Policy has Client(X2,X1) , for all X3 : Coverage(X3) , X3.limit=C3, Policy has Coverage(X2,X3) \|\|\| what are all coverage premium for which coverage belongs to policy, policy has client, client name is C1, client state is C2? |

The resulting fluent question is shown in Table 4.

TABLE 4

| |
|---|
| What are all the coverage premiums for coverages that belong to a policy with a client whose name is C1 and state is C2? |

The complex query utterances that can be generated include, but are not limited to:

- Multiple verbalizations for the edges and node attributes.
- Variations on the quantifiers.
- Variations on the wh questions, depending on the type of the query attribute.
- Superlative/Aggregate/Comparison questions, which require comparing pairs of attributes.
- Time expressions.
- Hyper-edges with more than one head node, to support predicates with more than two arguments.

Described herein is utilization of the knowledge graphs 218.

A knowledge graph is employed to generate natural language utterances corresponding to the validated paths in the attributed query subgraph obtained from the ontology graph. The knowledge graph is populated with structured information extracted from diverse knowledge sources, including databases, ontologies, and external repositories. This enriched knowledge representation enables the generation of coherent and contextually relevant utterances.

Figure 6:
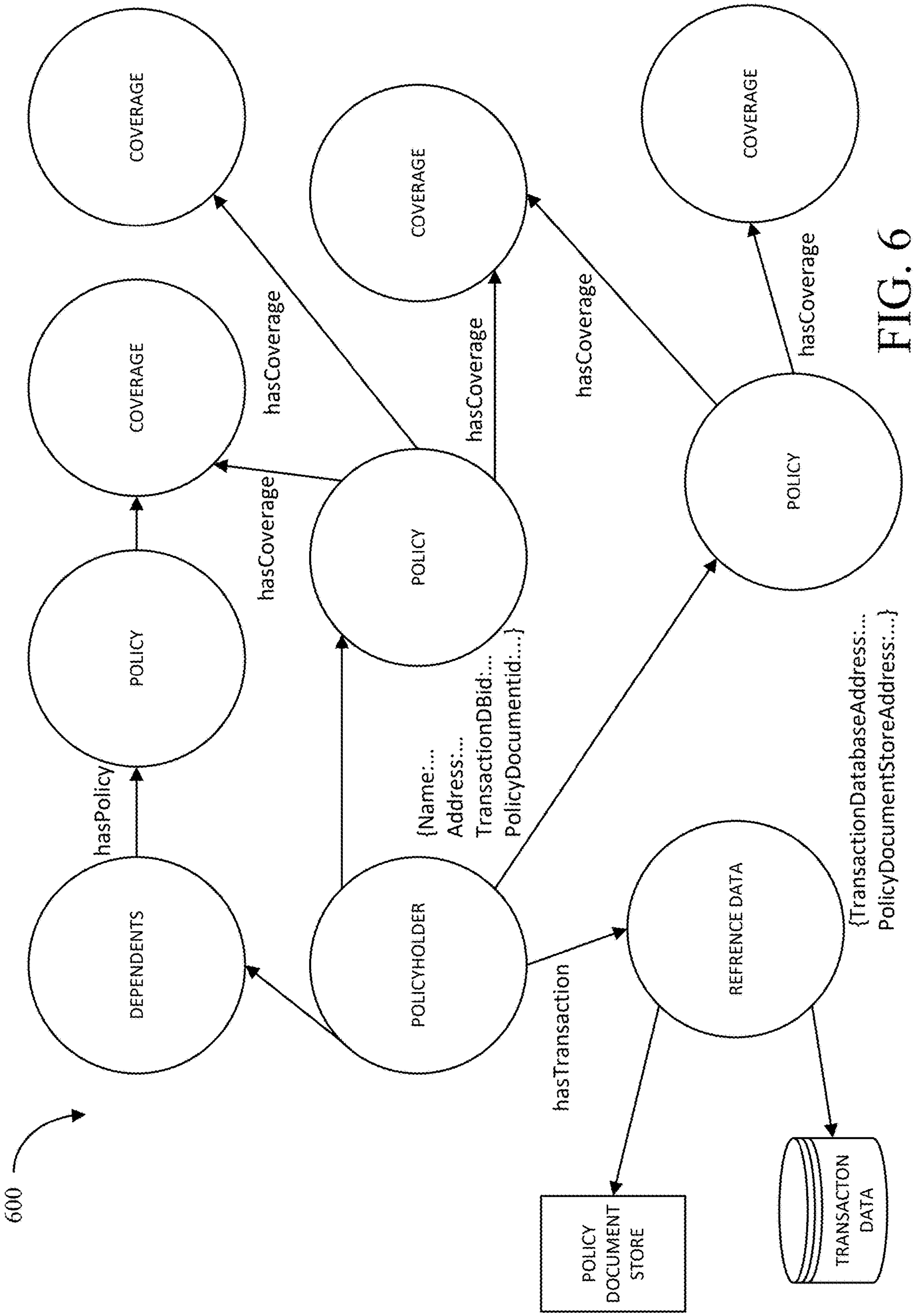
FIG. 6 is an example data traversal in an example knowledge graph in accordance with embodiments of this disclosure.

FIG. 6 is an example data traversal 600 in an example knowledge graph in accordance with embodiments of this disclosure. A graph database can be modelled to store information related to policyholders, policies, and related reference information. The modeled graph can be traversed in multiple directions through the relation or edge components to retrieve the information of interest for an utterance. Additional details such as Policy Document and Transaction details can also be stored in the graph through reference keys. Additional details can be fetched from the respective information store through queries and address details stored in Reference Data nodes.

Figure 7:
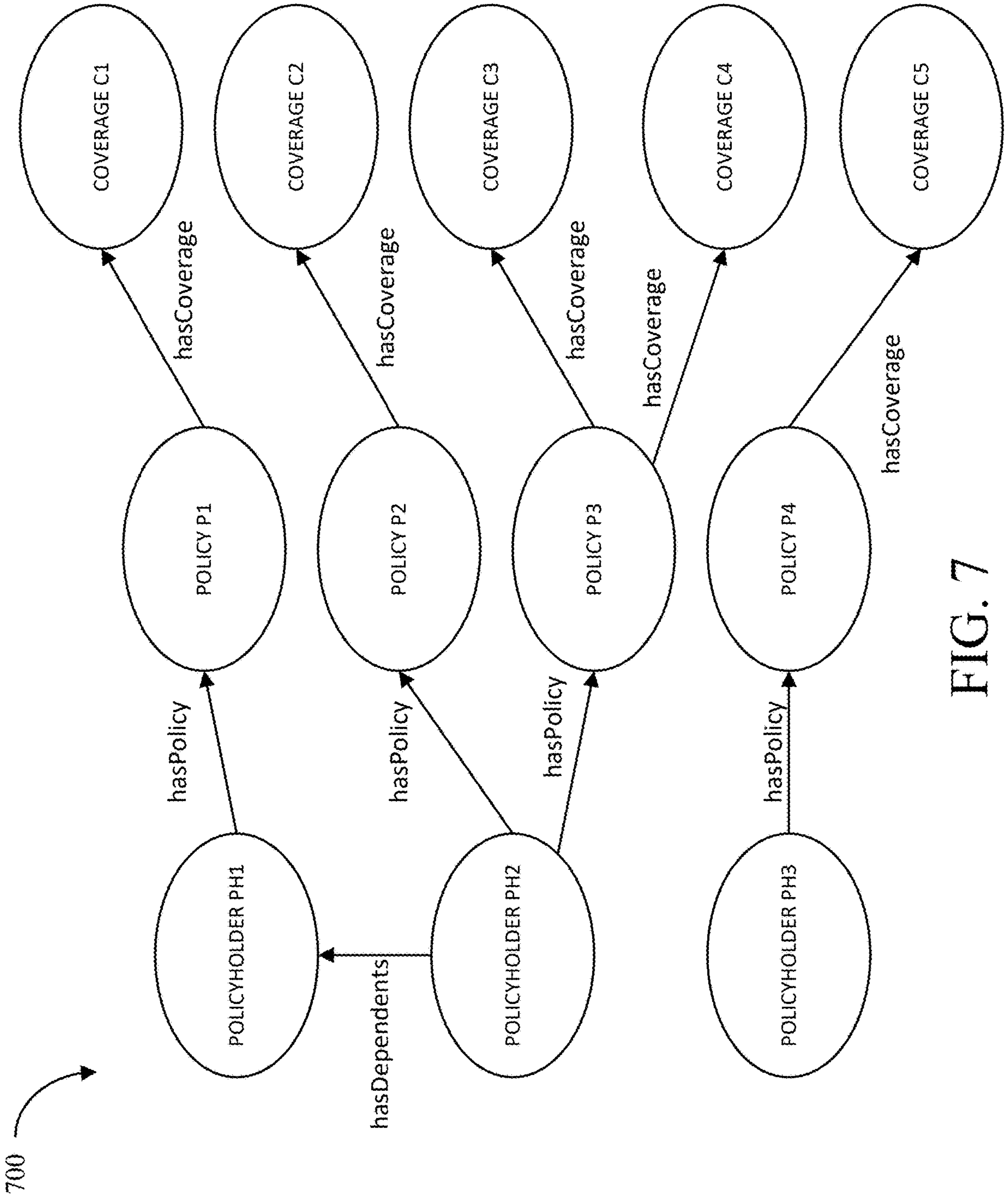
FIG. 7 is an example knowledge subgraph grounding in accordance with embodiments of this disclosure.

FIG. 7 is an example knowledge graph/subgraph grounding 700 in accordance with embodiments of this disclosure. The example knowledge graph 700 holds details of policyholders, policy, and the respective coverages. The diagram shows three policyholders PH1, PH2, and PH3. PH1 is also dependent on PH2 and holding policy P1, similarly, PH2 is holding two policies P2 and P3, and PH3 is holding policy P4. Each of the policies will have respective coverages. Each Knowledge Graph node will hold sufficient attributes to distinctively represent the entity:

- Policy nodes have attributes such as PolicyNumber, StartDate, EndDate
- PolicyHolder nodes have attributes such as Name, Age, Address
- Coverage nodes have attributes such as CoverageName, CoverageValue and so on. Examples of CoverageName would be "Covered Auto Liability", "Covered Auto"

In implementations, a knowledge graph grounded dialogue system takes a natural language question as input and outputs the potential answer based on the knowledge graph (KG).

Figure 8:
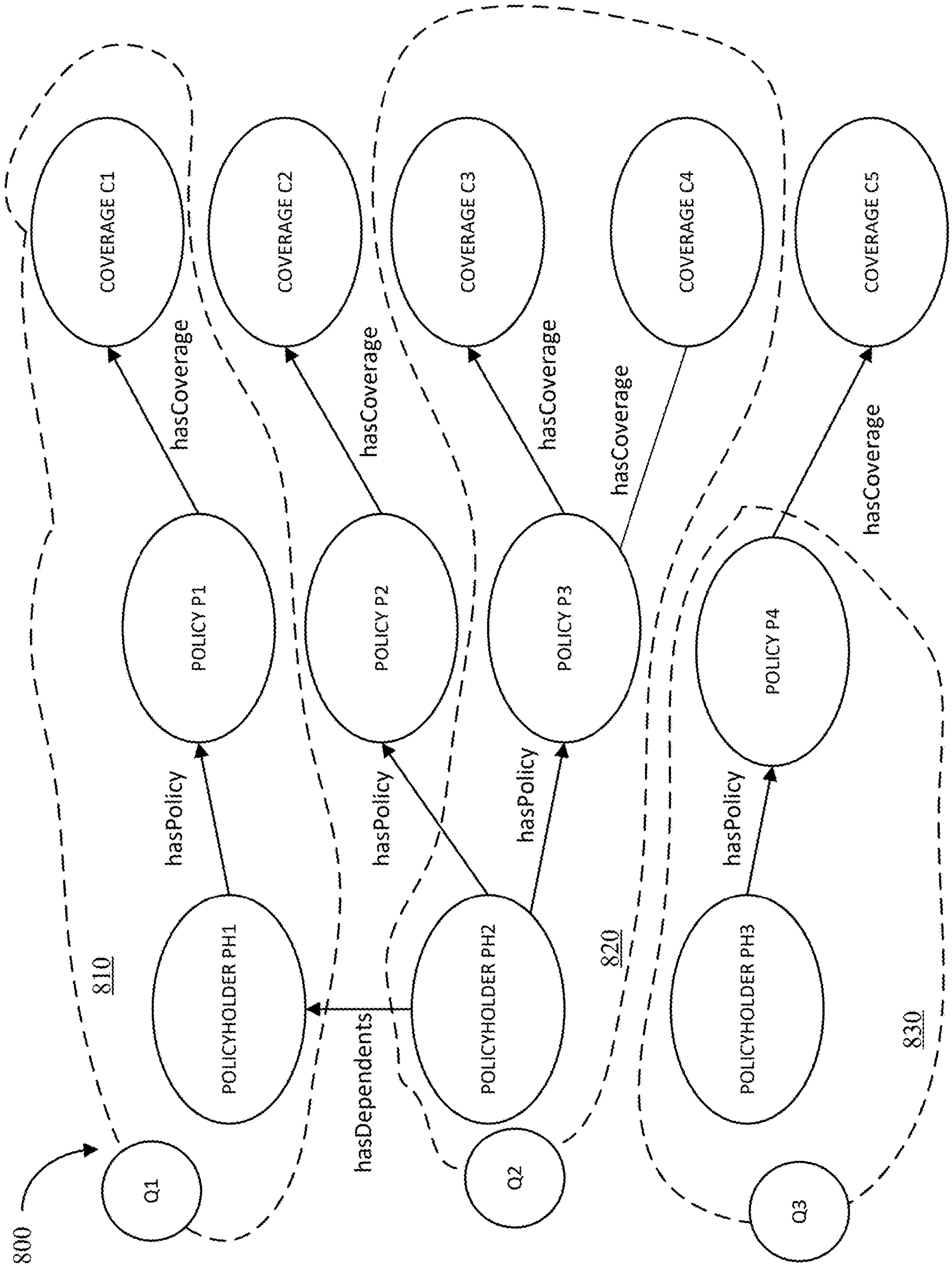
FIG. 8 is an illustration of an example knowledge subgraph grounding for sample queries on a knowledge graph in accordance with embodiments of this disclosure.

FIG. 8 is an illustration of an example knowledge subgraph grounding 800 for sample queries on a knowledge graph in accordance with embodiments of this disclosure. The example knowledge subgraph grounding 800 shows the grounding sub-graphs 810, 820, and 830, respectively, for answering an utterance/query. For example:

- Q1) Show all the policyholders who have coverage C1
- Q2) List all the coverages and policyholder details for the policy P3
- Q3) Can you show the policy that is held by PH3

The process of grounding would involve identifying the entities present in the utterance and correspondingly forming dynamic queries to query the database. The subgraph grounding of a knowledge graph helps in validating the effectiveness and applicability of an utterance that is generated from an attributed ontology subgraph.

Described herein is utterance refinement and rephrasing.

The generated utterances undergo refinement and rephrasing using a large language model such as the large language model 240. Techniques such as neural machine translation, paraphrasing, and language generation are employed to enhance the coherence and linguistic quality of the utterances. The large language model 540 captures linguistic nuances and ensures that the synthetic data closely resemble natural language utterances. Table 5 shows a few examples of logical forms, utterances, and LLM rewrites.

TABLE 5

| LOGICAL FORM | UTTERANCE | LLM REWRITE |
|---|---|---|
| QUERY(X1.number) such that, for all X1 : Policy(X1), Policy.endorsement date = C1 | what are all policy number for which policy endorsement date is C1? | What are all the policy numbers for which the policy endorsement date is C1? |
| QUERY(X2.limit) such that, for all X1 : Policy(X1), Policy.endorsement date = C1, there exists X2 : Coverage(X2) , Policy has Coverage(X1, X2) | what are all coverage limit for which coverage belongs to policy, policy endorsement date is C1? | What are all the coverage limits for coverages that belong to a policy with an endorsement date of C1? |
| QUERY(X4.limit) such that, for all X1 : Client(X1), Client.state = C1 AND Client.city = C2, exists X2: Policy(X2), Policy has | what are all coverage limit for which coverage belongs to policy, policy | What are all the coverage limits for the coverages that belong to |

TABLE 5-continued

| LOGICAL FORM | UTTERANCE | LLM REWRITE |
|---|---|---|
| Client(X2, X1), for all X3 : Agent(X3), Agent.name = C3 AND Agent.state = C4, Policy has Agent(X2, X3), there exists X4 : Coverage(X4) , Policy has Coverage(X2, X4) | is issued by agent, agent name is C3, agent state is C4, policy has client, client state is C1, client city is C2? | policies issued by an agent with the name C3, state C4, and for clients from the state C1 and city C2? |
| QUERY(X2) such that, for all X1: Coverage(X1), Coverage.limit = C1, for all X2: Policy(X2), Policy.endorsement date = C2, Policy has Coverage(X2, X1), for all X3 : Agent(X3), Agent.name = C3 AND Agent.city = C4, Policy has Agent(X2, X3) | What are all policy for which policy is issued by agent, agent name is C3, agent city is C4, policy has coverage, coverage limit is C1 ? | What are all the policies for which an agent with the name C3 and residing in the city C4 issues the policy, and the policy has coverage with a limit of C1? |

In implementations, the system comprises various modules, including a processor, traversal module, subgraph generation module, path recognition module, validation module, knowledge graph interface, and language model interface. These modules work in conjunction to execute the method steps and facilitate the generation of synthetic <logical form, utterance> pairs. Additionally, a data storage module is provided to store the generated datasets, ontology graph, and other intermediate representations. The process of generating synthetic <logical form, utterance> pairs using the components and processes described above, facilitates the training of semantic parsers.

Described herein are systems and methods for scalable generation of synthetic data for semantic parsers. In implementations, a computer-readable storage medium storing instructions that, when executed by a processor, cause the processor to perform the method for generating synthetic <logical form, utterance> pairs for training a semantic parser, includes constructing an ontology graph from a plurality of enterprise documents to represent relationships among concepts or classes within an organization, traversing one or more paths among a plurality of source and destination node pairs within the ontology graph to generate a query subgraph for the ontology graph, constructing a semantic representation of the relationships between respective source nodes and destination nodes for the query subgraph, translating each semantic representation into an initial logical form by mapping each traversed path in the query subgraph to a corresponding predicate in the initial logical form, generating attributed query subgraphs comprising source nodes, destination nodes, and hidden nodes based on respective traversed paths, recognizing each source to destination path among a variety of possible source to destination paths between source and destination nodes within each of the attributed query subgraphs, validating each source to destination path in each of the attributed query subgraphs by considering at least a plurality of predicates, generating natural language utterances through enumeration of one or more combinations of source to destination paths in each attributed query subgraph, utilizing a knowledge subgraph to ground the natural language utterances corresponding to the validated source to destination paths to generate grounded natural language utterances for each attributed query subgraph, refining and rephrasing the grounded natural language utterances using a large language model to enhance coherence and linguistic quality for each attributed query subgraph, generating one or more logical forms from initial logical forms based on each of the attributed query subgraphs, and generating the synthetic <logical form, utterance> pairs for training the semantic parser from appropriate refined natural language utterances and appropriate logical forms.

In implementations, the ontology graph is constructed using at least one of natural language processing, entity extraction, and relationship extraction from the plurality of enterprise documents. In implementations, the attributed query subgraphs are generated based on the semantic relationships inferred from the ontology graph and incorporate attributes representing contextual information associated with each of the source nodes, the destination nodes, and the hidden nodes in a respective attributed query subgraph. In implementations, the source nodes, the destination nodes, and the hidden nodes are selectively identified for an attributed query subgraph for meaningful generation of the logical forms according to domain-specific knowledge or rules in different domains. In implementations, the computer-readable storage medium further includes considering conditions on nodes, edges, and graph structures like AND graph, AND-OR graph, etc. while traversing the one or more paths. In implementations, the plurality of predicates considered for path validation include at least one of semantic constraints, syntactic patterns, and domain-specific rules. In implementations, the knowledge graph is populated with structured information extracted from diverse knowledge sources including databases, ontologies, and external repositories. In implementations, the large language model employs at least one of neural machine translation, paraphrasing, and language generation to refine and rephrase the generated utterances.

Described herein are systems and methods for scalable generation of synthetic data for semantic parsers. In implementations, a system for scalable generation of synthetic <logical form, utterance> pairs for training a semantic parser, the system includes a processor configured to construct an ontology graph from a plurality of enterprise documents, wherein the ontology graph represents relationships among concepts or classes within an organization, a path traversal module configured to traverse one or more paths among a plurality of source and destination node pairs within the ontology graph to generate a query subgraph for the ontology graph, a graph generation module configured to generate attributed query subgraphs comprising source nodes, destination nodes, and hidden nodes based on the traversed paths, a path recognition module configured to recognize each path among a variety of possible paths between source and destination nodes within the ontology graph, a validation module configured to validate each path in the query subgraph by considering a plurality of predicates, a natural language utterance generation module configured to generate natural language utterances based on the validated paths and knowledge subgraph grounding, and a refinement module configured to refine and rephrase the generated utterances using a large language model to enhance coherence and linguistic quality.

In implementations, the system further includes a data storage module configured to store the ontology graph, attributed query subgraphs, knowledge graph, and generated <logical form, utterance> pairs. In implementations, the processor is further configured to perform distributed computing tasks for scalable generation of synthetic data across multiple computing nodes. In implementations, the knowledge graph interface integrates with external knowledge sources through application programming interfaces to retrieve and incorporate structured information for natural language utterance generation. In implementations, the path traversal module further configured to construct a semantic representation of the relationships between respective source nodes and destination nodes for the query subgraph, and translate each semantic representation into an initial logical form by mapping each traversed path in the query subgraph to corresponding predicates in the initial logical form. In implementations, the refinement module further configured to generate one or more logical forms from initial logical forms based on each of the attributed query subgraphs, and generate the synthetic <logical form, utterance> pairs for training the semantic parser from appropriate refined natural language utterances and appropriate logical forms. In implementations, the ontology graph is constructed using at least one of natural language processing, entity extraction, and relationship extraction from the plurality of enterprise documents. In implementations, the attributed query subgraphs are generated based on the semantic relationships inferred from the ontology graph and incorporate attributes representing contextual information associated with each of the source nodes, the destination nodes, and the hidden nodes in a respective attributed query subgraph. In implementations, the source nodes, the destination nodes, and the hidden nodes are selectively identified for an attributed query subgraph for meaningful generation of the logical forms according to domain-specific knowledge or rules in different domains. In implementations, the plurality of predicates considered for path validation include at least one of semantic constraints, syntactic patterns, and domain-specific rules. In implementations, a knowledge graph used for the knowledge subgraph grounding is populated with structured information extracted from diverse knowledge sources including databases, ontologies, and external repositories. In implementations, the large language model employs at least one of neural machine translation, paraphrasing, and language generation to refine and rephrase the generated utterances.

While the embodiments described herein may be susceptible to various modifications and alternative forms, specific embodiments thereof are shown by way of example in the drawings and will be described in detail below. It should be understood, however that these examples not intended to limit the embodiments to the particular forms disclosed, but on the contrary, the disclosed embodiments cover all modifications, equivalents, and alternatives falling within the spirit and the scope of the disclosure as defined by the appended claims.

The method steps have been represented, wherever appropriate, by conventional symbols in the drawings, showing those specific details that are pertinent to understanding the embodiments so as not to obscure the disclosure with details that will be readily apparent to those of ordinary skill in the art having benefit of the description herein.

The terms "comprises," "comprising," or any other variations thereof, are intended to cover a non-exclusive inclusion, such that a process, method that comprises a list of steps does not include only those steps but may include other steps not expressly listed or inherent to such process or method. Similarly, one or more elements in a system or apparatus proceeded by "comprises . . . a" does not, without more constraints, preclude the existence of other elements or additional elements in the system or apparatus.

The features of the present embodiments are set forth with particularity in the appended claims. Each embodiment itself, together with further features and attended advantages, will become apparent from consideration of the following detailed description, taken in conjunction with the accompanying drawings.

The disclosed embodiments describe retrieving and organizing information from a set of applications, data sources, or both, by performing various steps as is described in details in forthcoming sections. For the sake explanation and understanding, reference is drawn towards a typical search query where the process heavily relies on multi-modality technology for converging speech, text, images, touch, language, and the like. Success of such a multi-modality platform mainly depends on how good and relevant the obtained results are.

Having described and illustrated the principles with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein.

Elements of the described embodiments shown in software may be implemented in hardware and vice versa. As will be appreciated by those ordinary skilled in the art, the foregoing example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine-readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory. Modules can be defined by executable code stored on non-transient media.

The following description is presented to enable a person of ordinary skill in the art to make and use the embodiments and is provided in the context of the requirement for a obtaining a patent. The present description is the best presently-contemplated method for carrying out the present embodiments. Various modifications to the embodiments will be readily apparent to those skilled in the art and the generic principles of the present embodiments may be applied to other embodiments, and some features of the present embodiments may be used without the corresponding use of other features. Accordingly, the present embodiments are not intended to be limited to the embodiments shown but are to be accorded the widest scope consistent with the principles and features described herein.

What is claimed is:

1. A non-transitory computer-readable storage medium storing instructions that, when executed by a processor, cause the processor to perform a method for generating synthetic <logical form, utterance> pairs for training a semantic parser, comprising:

constructing an ontology graph from a plurality of enterprise documents to represent relationships among concepts or classes within an organization;

traversing one or more paths among a plurality of source and destination node pairs within the ontology graph to generate a query subgraph for the ontology graph;

constructing a semantic representation of the relationships between respective source nodes and destination nodes for the query subgraph;

translating each semantic representation into an initial logical form by mapping each traversed path in the query subgraph to a corresponding predicate in the initial logical form;

generating attributed query subgraphs comprising source nodes, destination nodes, and hidden nodes based on respective traversed paths;

recognizing each source to destination path among a variety of possible source to destination paths between source and destination nodes within each of the attributed query subgraphs;

validating each source to destination path in each of the attributed query subgraphs by considering at least a plurality of predicates;

generating natural language utterances through enumeration of one or more combinations of source to destination paths in each attributed query subgraph;

utilizing a knowledge graph to ground the natural language utterances corresponding to the validated source to destination paths to generate grounded natural language utterances for each attributed query subgraph;

refining and rephrasing the grounded natural language utterances using a large language model to enhance coherence and linguistic quality for each attributed query subgraph;

generating one or more logical forms from initial logical forms based on each of the attributed query subgraphs; and generating the synthetic <logical form, utterance> pairs for training the semantic parser from appropriate refined natural language utterances and appropriate logical forms.

2. The non-transitory computer-readable storage medium of claim 1, wherein the ontology graph is constructed using at least one of natural language processing, entity extraction, and relationship extraction from the plurality of enterprise documents.

3. The non-transitory computer-readable storage medium of claim 1, wherein the attributed query subgraphs are generated based on the semantic relationships inferred from the ontology graph and incorporate attributes representing contextual information associated with each of the source nodes, the destination nodes, and the hidden nodes in a respective attributed query subgraph.

4. The non-transitory computer-readable storage medium of claim 1, wherein the source nodes, the destination nodes, and the hidden nodes are selectively identified for an attributed query subgraph for meaningful generation of the logical forms according to domain-specific knowledge or rules in different domains.

5. The non-transitory computer-readable storage medium of claim 1, further comprising:

considering conditions on nodes, edges, and graph structures like AND graph, AND-OR graph, etc. while traversing the one or more paths.

6. The non-transitory computer-readable storage medium of claim 1, wherein the plurality of predicates considered for path validation include at least one of semantic constraints, syntactic patterns, and domain-specific rules.

7. The non-transitory computer-readable storage medium of claim 1, wherein the knowledge graph is populated with structured information extracted from diverse knowledge sources including databases, ontologies, and external repositories.

8. The non-transitory computer-readable storage medium of claim 1, wherein the large language model employs at least one of neural machine translation, paraphrasing, and language generation to refine and rephrase the generated utterances.

9. A system for scalable generation of synthetic <logical form, utterance> pairs for training a semantic parser, the system comprising:

a processor configured to construct an ontology graph from a plurality of enterprise documents, wherein the ontology graph represents relationships among concepts or classes within an organization;

a path traversal module configured to traverse one or more paths among a plurality of source and destination node pairs within the ontology graph to generate a query subgraph for the ontology graph;

a graph generation module configured to generate attributed query subgraphs comprising source nodes, destination nodes, and hidden nodes based on the traversed paths;

a path recognition module configured to recognize each path among a variety of possible paths between source and destination nodes within the ontology graph;

a validation module configured to validate each path in the query subgraph by considering a plurality of predicates;

a natural language utterance generation module configured to generate natural language utterances based on the validated paths and knowledge subgraph grounding; and a refinement module configured to refine and rephrase the generated utterances using a large language model to enhance coherence and linguistic quality.

10. The system of claim 9, further comprising:

a data storage module configured to store the ontology graph, attributed query subgraphs, knowledge graph, and generated <logical form, utterance> pairs.

11. The system of claim 9, wherein the processor is further configured to perform distributed computing tasks for scalable generation of synthetic data across multiple computing nodes.

12. The system of claim 9, wherein a knowledge graph interface integrates with external knowledge sources through application programming interfaces to retrieve and incorporate structured information for natural language utterance generation.

13. The system of claim 9, the path traversal module further configured to:

construct a semantic representation of the relationships between respective source nodes and destination nodes for the query subgraph; and translate each semantic representation into an initial logical form by mapping each traversed path in the query subgraph to corresponding predicates in the initial logical form.

14. The system of claim 13, the refinement module further configured to:

generate one or more logical forms from initial logical forms based on each of the attributed query subgraphs; and generate the synthetic <logical form, utterance> pairs for training the semantic parser from appropriate refined natural language utterances and appropriate logical forms.

15. The system of claim 9, wherein the ontology graph is constructed using at least one of natural language processing, entity extraction, and relationship extraction from the plurality of enterprise documents.

16. The system of claim 9, wherein the attributed query subgraphs are generated based on semantic relationships inferred from the ontology graph and incorporate attributes representing contextual information associated with each of the source nodes, the destination nodes, and the hidden nodes in a respective attributed query subgraph.

17. The system of claim 9, wherein the source nodes, the destination nodes, and the hidden nodes are selectively identified for an attributed query subgraph for meaningful generation of the logical forms according to domain-specific knowledge or rules in different domains.

18. The system of claim 9, wherein the plurality of predicates considered for path validation include at least one of semantic constraints, syntactic patterns, and domain-specific rules.

19. The system of claim 9, wherein a knowledge graph used for the knowledge subgraph grounding is populated with structured information extracted from diverse knowledge sources including databases, ontologies, and external repositories.

20. The system of claim 9, wherein the large language model employs at least one of neural machine translation, paraphrasing, and language generation to refine and rephrase the generated utterances.

* * * * *